(12) United States Patent
Kung et al.

(10) Patent No.: US 11,852,879 B2
(45) Date of Patent: Dec. 26, 2023

(54) OPTICAL TRANSCEIVER WITH INTERNAL GAS FLOW PASSAGE FOR HEAT DISSIPATION

(71) Applicant: Prime World International Holdings Ltd., New Taipei (TW)

(72) Inventors: Ling-An Kung, New Taipei (TW); Ming-You Lai, New Taipei (TW); Che-Shou Yeh, New Taipei (TW)

(73) Assignee: Prime World International Holdings Ltd., New Taipel (TW)

( * ) Notice: Subject to any disclaimer, the term of this patent is extended or adjusted under 35 U.S.C. 154(b) by 0 days.

(21) Appl. No.: 17/578,137

(22) Filed: Jan. 18, 2022

(65) Prior Publication Data

US 2023/0228956 A1 Jul. 20, 2023

(51) Int. Cl.
*H04B 10/00* (2013.01)
*G02B 6/42* (2006.01)
*H04B 10/40* (2013.01)
*G02B 6/38* (2006.01)
*H04B 10/50* (2013.01)

(52) U.S. Cl.
CPC ......... *G02B 6/4277* (2013.01); *G02B 6/3814* (2013.01); *H04B 10/40* (2013.01); *H04B 10/501* (2013.01)

(58) Field of Classification Search
CPC .... G02B 6/4277; G02B 6/3814; H04B 10/40; H04B 10/501
See application file for complete search history.

(56) References Cited

U.S. PATENT DOCUMENTS

| | | | | |
|---|---|---|---|---|
| 9,620,907 | B1* | 4/2017 | Henry | H01R 13/6582 |
| 9,668,379 | B1* | 5/2017 | Bucher | H05K 7/20436 |
| 9,912,107 | B2* | 3/2018 | Bucher | G02B 6/4269 |
| 9,992,912 | B1* | 6/2018 | Wang | H01L 23/4093 |
| 10,073,230 | B2* | 9/2018 | Wilcox | H04B 10/40 |
| 10,104,760 | B1* | 10/2018 | Briant | G02B 6/4284 |
| 10,128,627 | B1* | 11/2018 | Kazav | G02B 6/4246 |
| 10,651,607 | B1* | 5/2020 | Gawlowski | H01R 13/659 |
| 2003/0086660 | A1* | 5/2003 | Brezina | G02B 6/4201 385/88 |
| 2004/0027816 | A1* | 2/2004 | Ice | G02B 6/4201 361/797 |
| 2011/0051373 | A1* | 3/2011 | McColloch | G02B 6/4201 361/709 |
| 2013/0323963 | A1* | 12/2013 | Morrison | H05K 9/0058 174/377 |
| 2016/0149324 | A1* | 5/2016 | Regnier | H01R 43/205 29/874 |
| 2016/0211623 | A1* | 7/2016 | Sharf | G02B 6/4261 |

(Continued)

*Primary Examiner* — Agustin Bello
(74) *Attorney, Agent, or Firm* — Grossman Tucker Perreault & Pfleger, PLLC

(57) ABSTRACT

An optical transceiver includes a housing, a rib structure mounted on an inner surface of the housing, an optical communication module accommodated in the housing, and a heat conductive module. A gas flow passage is formed between each pair of adjacent ribs of the rib structure. The optical communication module includes a substrate and an optical communication component, and the optical communication component is in thermal contact with the housing. The heat conductive module is in thermal contact with the rib structure and the optical communication component.

20 Claims, 5 Drawing Sheets

(56) References Cited

U.S. PATENT DOCUMENTS

| | | | | |
|---|---|---|---|---|
| 2016/0211625 | A1* | 7/2016 | Sharf | G02B 6/4284 |
| 2017/0054234 | A1* | 2/2017 | Kachlic | H01R 12/712 |
| 2017/0285282 | A1* | 10/2017 | Regnier | G02B 6/4269 |
| 2018/0034211 | A1* | 2/2018 | Little | H01R 13/6581 |
| 2018/0049348 | A1* | 2/2018 | Bucher | G02B 6/4271 |
| 2018/0116063 | A1* | 4/2018 | Tracy | H05K 7/02 |
| 2018/0206353 | A1* | 7/2018 | Briant | H05K 5/0069 |
| 2018/0212385 | A1* | 7/2018 | Little | H01R 13/6581 |
| 2018/0338387 | A1* | 11/2018 | Park | G02B 6/4284 |
| 2019/0044299 | A1* | 2/2019 | Kazav | H01R 4/52 |
| 2019/0116692 | A1* | 4/2019 | Little | H05K 7/20418 |
| 2019/0181593 | A1* | 6/2019 | Little | H01R 13/6593 |
| 2019/0278037 | A1* | 9/2019 | Leigh | H01R 12/7005 |
| 2020/0049912 | A1* | 2/2020 | Lu | G02B 6/4269 |
| 2020/0091637 | A1* | 3/2020 | Scholeno | H01R 12/724 |
| 2020/0113077 | A1* | 4/2020 | Tittenhofer | H05K 5/0256 |
| 2020/0150366 | A1* | 5/2020 | Tittenhofer | G02B 6/4271 |
| 2021/0072473 | A1* | 3/2021 | Wall, Jr. | H05K 1/0274 |
| 2021/0103108 | A1* | 4/2021 | Wall, Jr. | G02B 6/4269 |
| 2021/0141175 | A1* | 5/2021 | Wang | G02B 6/423 |
| 2021/0235597 | A1* | 7/2021 | Chopra | G02B 6/4269 |
| 2021/0247577 | A1* | 8/2021 | Hsiao | H05K 7/2039 |
| 2022/0019040 | A1* | 1/2022 | Lu | G02B 6/4246 |
| 2022/0159878 | A1* | 5/2022 | Dillman | H05K 1/18 |

\* cited by examiner

OPTICAL TRANSCEIVER WITH INTERNAL GAS FLOW PASSAGE FOR HEAT DISSIPATION

BACKGROUND

1. Technical Field

The present disclosure relates to optical communication, more particularly to an optical transceiver.

2. Related Art

Optical modules, such as optical transceivers, are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. Different form factors for the optical transceivers such as XFP (10 Gigabit Small Form Factor Pluggable) used in 10 GB/s communication rate, QSFP (Quad Small Form-factor Pluggable), or others including QSFP28 and QSFP-DD (double density) at different communication rates have been made available.

The internal design of an optical transceiver can have a large impact on the thermal performance of a QSFP-DD transceiver in a system. The goal of a system thermal design is to properly remove the heat, so that the internal components within the transceiver could stay within certain temperature ranges when operating to enhance optimal performance and reliability.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
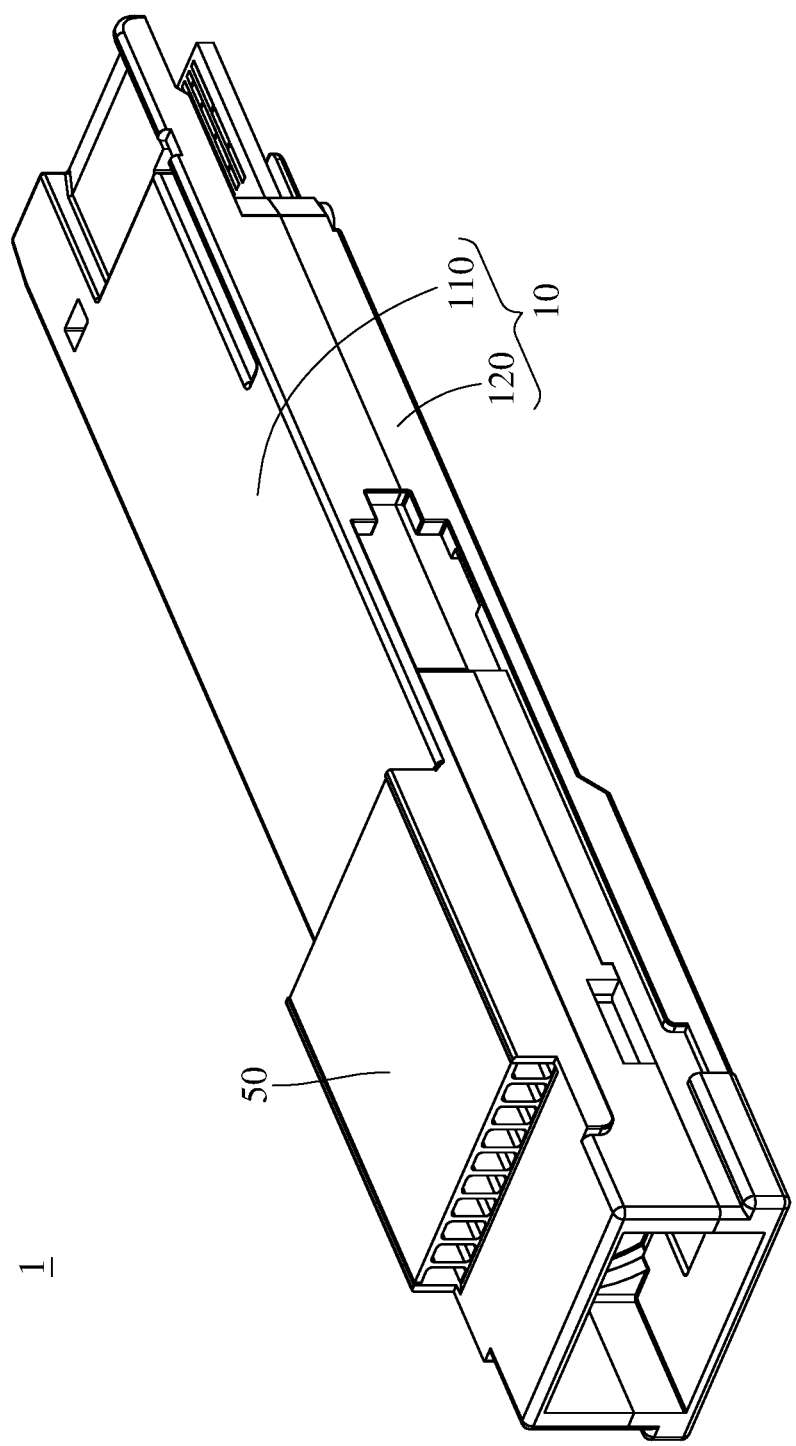
FIG. 1 is a perspective view of an optical transceiver according to one embodiment of the present disclosure.
Figure 2:
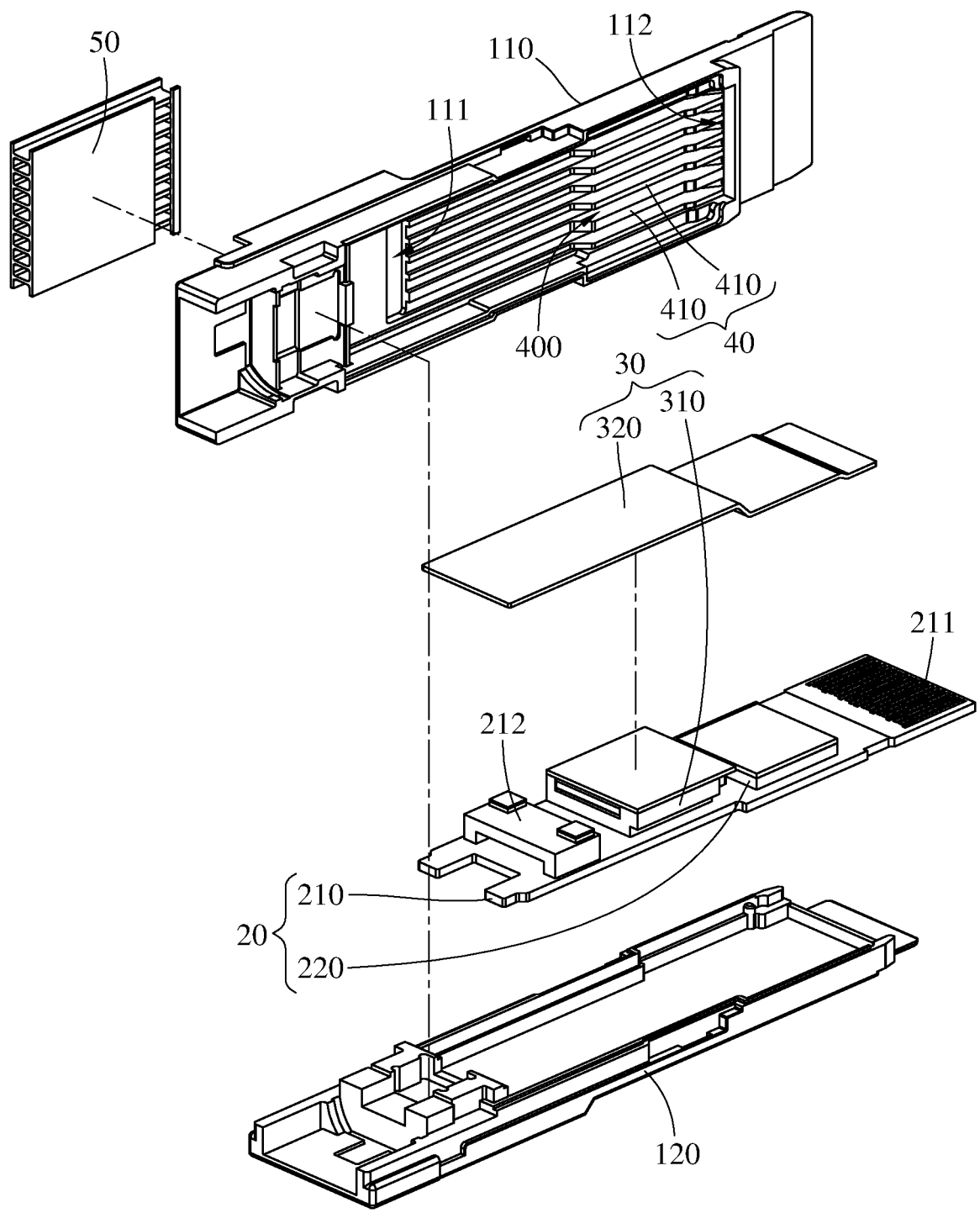
FIG. 2 is an exploded view of the optical transceiver in FIG. 1.
Figure 3:
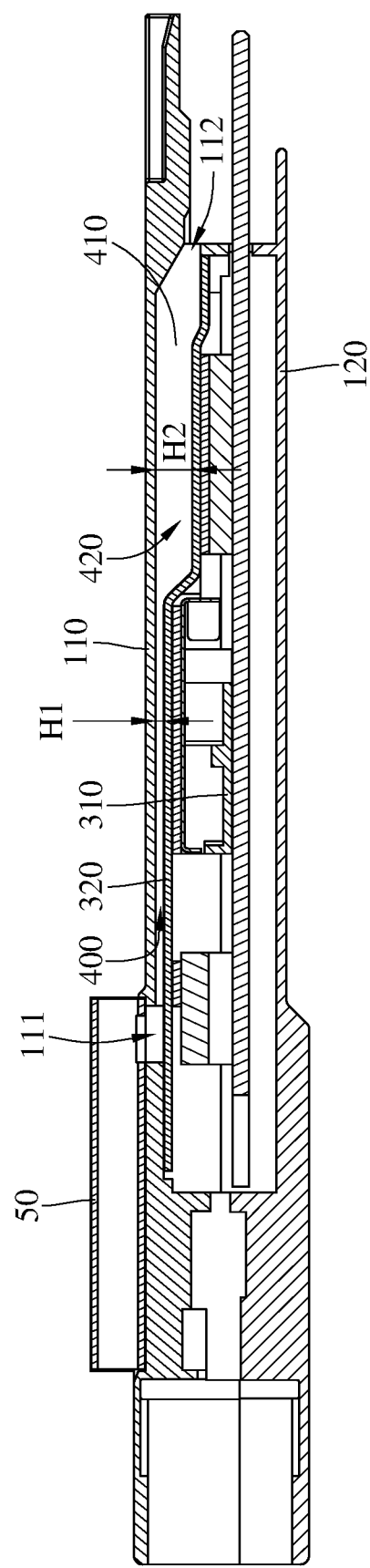
FIG. 3 is a cross-sectional view of the optical transceiver in FIG. 1.

Please refer to FIG. 1 through FIG. 3. FIG. 1 is a perspective view of an optical transceiver according to one embodiment of the present disclosure. FIG. 2 is an exploded view of the optical transceiver in FIG. 1. FIG. 3 is a cross-sectional view of the optical transceiver in FIG. 1. In this embodiment, an optical transceiver 1 may include a housing 10, an optical communication module 20, a heat conductive module 30 and a rib structure 40.

The housing 10 includes an upper casing 110 and a lower casing 120 assembled together. The housing 10 may be configured to be inserted into a cage in pluggable manner for optical communication.

The optical communication module 20 is accommodated in the housing 10, and the optical communication module 20 may include a substrate 210 and an optical communication component 220. The substrate 210 is, for example, a circuit board accommodated in the housing 10. The substrate 210 may include one or more electrical interfaces 211 functioning as an electrical port of the optical transceiver 1, and a fiber connector 212, such as MPO, LC, CS or SN interface, functioning as a fiber optic port of the optical transceiver 1 opposite to the electrical port. The optical communication component 220 is provided between the substrate 210 and the upper casing 110 of the housing 10. The optical communication component 220 may be a transmitter optical sub-assembly (TOSA) which may include a laser diode (LD) and monitor photodiode (MPD), or a receiver optical sub-assembly (ROSA) which may include a photodiode and a trans-impedance amplifier (TIA). The optical communication component 220 may be electrically connected with a driver IC chip (not shown in the drawings) mounted on the substrate 210.

The heat conductive module 30 may include a carrier 310 mounted on the substrate 210 of the optical communication module 20, and an interlayer element 320 provided between the upper casing 110 of the housing 10 and the optical communication module 20. The optical communication component 220 is supported on and in thermal contact with the carrier 310, and the carrier 310 is in thermal contact with the interlayer element 320. The carrier 310 may feature lower thermal expansion coefficient and be made of high hardness material such as tungsten copper alloy. The interlayer element 320 may be a thermal pad or a copper plate.

The rib structure 40 is mounted on an inner surface of the upper casing 110 of the housing 10. Specifically, the rib structure 40 may be monolithically formed on the upper casing 110 by molding process. The rib structure 40 may include a plurality of ribs 410, and a gas flow passage 400 may be formed between each pair of adjacent ribs 410 of the rib structure 40. The optical communication component 220 is in thermal contact with the housing 10 through the heat conductive module 30 and the rib structure 40. Specifically, the interlayer element 320 of the heat conductive module 30 may be provided between the rib structure 40 and the optical communication component 220. At the same time, the interlayer element 320 may physically touch the ribs 410. The optical communication component 220 may be in direct thermal contact with one side of the interlayer element 320 and/or in indirect thermal contact with the interlayer element 320 through the carrier 310, and the other side of the interlayer element 320 may be in thermal contact with the rib structure 40.

Figure 4:
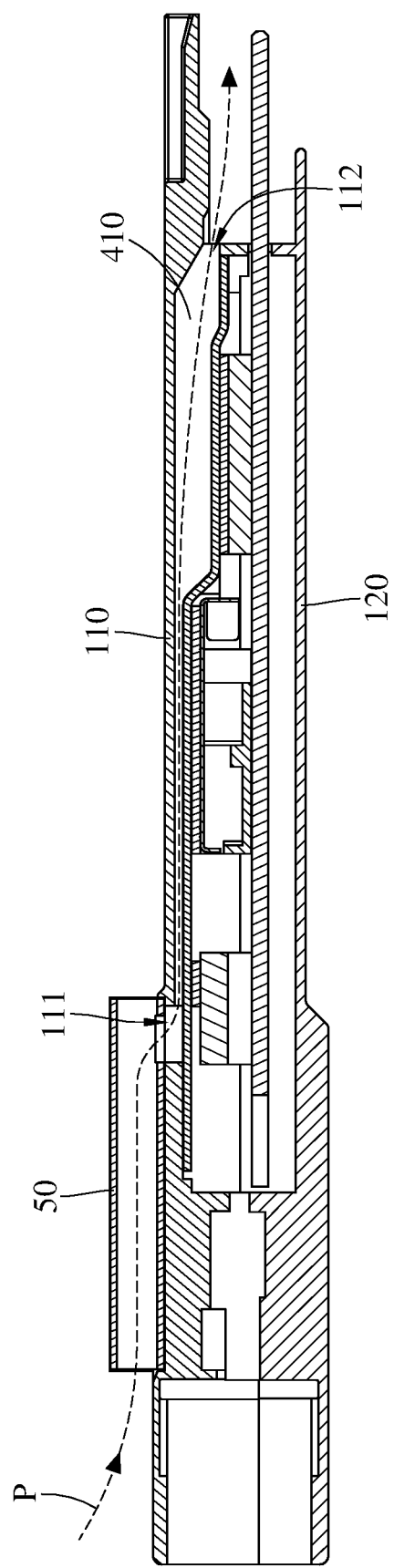
FIG. 4 is a schematic view showing a flow path for heat dissipation in the optical transceiver of FIG. 1.

FIG. 4 is a schematic view showing a flow path for heat dissipation in the optical transceiver of FIG. 1. In conjunction with FIG. 3 and FIG. 4, the gas flow passage 400 formed between each pair of adjacent ribs 410 of the rib structure 40 can help with the heat dissipation. In detail, the upper casing 110 of the housing 10 may define a gas inlet 111 and a plurality of gas outlets 112. The gas inlet 111 is located close to the fiber connector 212 of the optical communication module 20 (the fiber optic port of the optical transceiver 1), and the gas outlet 112 is located close to the electrical interface 211 of the optical communication module 20 (the electrical port of the optical transceiver 1). A flow path P may be indicative of gas passing through the gas inlet 111, the gas flow passage 400, and the gas outlet 112. It is worth noting that the housing may include a plurality of gas inlets or a plurality of gas outlets in another implementation.

The optical communication component 220 is supposed to generate heat during its operation, and some amount of such heat is transferred through the heat conductive module and the rib structure 40 to reach the upper casing 110. Also, an external airflow can flow into the housing 10 through the gas inlet 111 by natural or forced convection, helping to transfer some of that heat based on the movement of airflow flowing through the gas flow passages 400. At least a part of the heat generated over the course of the operation of the optical transceiver 1 might be properly flown out of the optical transceiver 1 through the gas outlet 112.

In this embodiment, the interlayer element 320 of the heat conductive module 30 may be attached to the rib structure 40 by thermally conductive adhesive or electrically conductive adhesive for electromagnetic interference (EMI) shielding. The attachment performed by thermally conductive adhesive could decrease the thermal contact resistance between the interlayer element 320 and the ribs 410. The attachment performed by electrically conductive adhesive can help preventing EMI.

In this embodiment, the interlayer element 320 may have a corresponding cross-sectional profile with the rib structure 40. As shown in FIG. 2 and FIG. 3, in view of a vertical cross section, the interlayer element 320 has substantially the same profile as the rib structure such that the interlayer element 320 can be considered to be in continuous contact with each rib 410, thus decreasing the thermal contact resistance between the interlayer element 320 and the rib structure 40.

In this embodiment, the rib structure 40 may include an enlarged section 420 where the gas flow passage 400 is enhanced in a direction from the rib structure 40 toward the substrate 210 of the optical communication module 20. As shown in FIG. 3, the left part of the rib structure 40 close to the fiber optic port, the gas flow passage 400 between adjacent ribs 410 may be associated with height H1 while the right part (enlarged section 420) of the rib structure 40 close to the electrical port may be associated with an increased height H2 (H2 is higher than H1). The gas flow passage 400 at a region nearby the gas outlet 112 can therefore flow the gas (or air flow) at a higher flow rate of so as to improve the heat dissipation efficiency.

Figure 5:
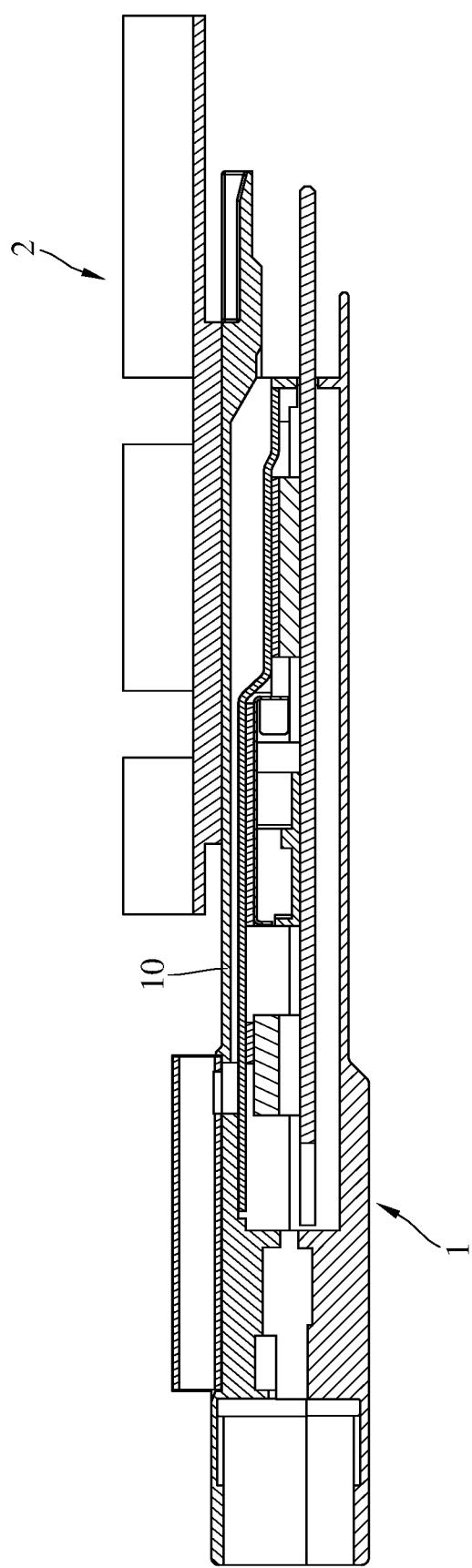
FIG. 5 is a schematic view showing the optical transceiver in FIG. 1 where a heat sink is provided.

In this embodiment, the optical transceiver 1 may further include a heat sink 50 mounted on an outer surface of the housing 10, as shown in FIG. 5. In conjunction with both FIG. 3 and FIG. 4, the heat sink 50, more specifically a type 2A heat sink, may be mounted on the outer surface of the upper casing 110. At least part of the heat sink 50 may be located above the gas inlet 111, and the gas inlet 111 may be communicated with air channels formed in the heat sink 50. The heat sink 50 can be served as a cover to prevent dust or other foreign objects from entering into the gas inlet 111. Since the gas inlet 111 is protected without additional covers, it helps to reduce an overall size of the optical transceiver 1.

FIG. 5 is a schematic view showing the optical transceiver in FIG. 1 where a heat sink is provided. Another heat sink 2 on the housing 10 may be in thermal contact with the optical transceiver 1. The heat sink 2 may be a copper board or include multiple fins.

As to devices for high-speed communication such as QSFP-DD 800G optical transceiver, since some active components with high output power, especially an optical subassembly, a single metallic element is insufficient to handle the entire heat dissipation. Due to a large amount of heat generated by the active components, heat accumulation may occur in the heat conductive component.

According to the present disclosure, a rib structure on the inner surface of the housing provides a gas flow passage between each pair of adjacent ribs. When the optical communication component generates the heat during its operation, some amount of heat is transferred through the heat conductive module and the ribs to reach the housing. Also, some amount of heat can be transferred due to the movement of airflow flowing through the gas flow passage. The ribs on the housing provides thermal conduction for heat dissipation, and the gas flow passage formed by the rib structure provides thermal convection for heat dissipation, thereby helping to prevent heat accumulation.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, comprising:
    a housing;
    a rib structure mounted on an inner surface of the housing, wherein a gas flow passage is formed between each pair of adjacent ribs of the rib structure, wherein the rib structure comprises an enlarged section where the gas flow passage is enlarged in a direction from the rib structure toward the substrate of the optical communication module such that a portion of the rib structure defining the gas flow passage has a first height, H1, and in the enlarged section, a portion of the rib structure has a second height, H2, that is higher than the first height, H1;
    an optical communication module accommodated in the housing, wherein the optical communication module comprises a substrate and an optical communication component, and the optical communication component is in thermal contact with the housing; and
    a heat conductive module in thermal contact with the rib structure and the optical communication.

2. The optical transceiver according to claim 1, wherein the heat conductive module comprises an interlayer element provided between the rib structure and the optical communication component, and the interlayer element physically touches the rib structure.

3. The optical transceiver according to claim 1, wherein the heat conductive module comprises a carrier mounted on the substrate of the optical communication module, and the optical communication component is supported on the carrier.

4. The optical transceiver according to claim 2, wherein the interlayer element is attached to the rib structure by thermally conductive adhesive or electrically conductive adhesive for EMI shielding.

5. The optical transceiver according to claim 2, wherein the interlayer element has a corresponding cross-sectional profile with the rib structure.

6. The optical transceiver according to claim 1, wherein the housing comprises a gas inlet and a gas outlet which are spatially connected with the flow passage formed between each pair of adjacent ribs of the rib structure, and the gas inlet, the gas outlet and the gas flow passage jointly define a flow path along which gas passes through the gas inlet, the gas flow passage and the gas outlet sequentially.

7. The optical transceiver according to claim 6, wherein the gas inlet is closer to a fiber optic port of the optical transceiver than the gas outlet.

8. The optical transceiver according to claim 6, further comprising a heat sink mounted on an outer surface of the housing, and at least part of the heat sink is located above the gas inlet.

9. The optical transceiver according to claim 1, wherein the optical transceiver is a QSFP-DD 800G transceiver.

10. An optical transceiver, comprising:
a housing comprises a gas inlet and a gas outlet;
a rib structure mounted on an inner surface of the housing, wherein a gas flow passage is formed between each pair of adjacent ribs of the rib structure, wherein the rib structure comprises an enlarged section where the gas flow passage is enlarged in a direction from the rib structure toward the optical communication module, the gas inlet and the gas outlet are spatially connected with the gas flow passage, the gas inlet is close to a fiber optic port of the optical transceiver and a portion of the rib structure defining the gas flow passage at the gas inlet has a first height, H1, and the gas outlet is close to an electrical port of the optical transceiver and a portion of the rib structure defining the gas flow passage at the gas outlet has a height, H2, that is higher than the first height, H1;
an optical communication module accommodated in the housing and in thermal contact with the housing; and
a heat conductive module in thermal contact with the rib structure and the optical communication module.

11. The optical transceiver according to claim 10, wherein the heat conductive module comprises an interlayer element provided between the rib structure and the optical communication module, and the interlayer element touches the rib structure.

12. The optical transceiver according to claim 11, wherein the interlayer element is attached to the rib structure by thermally conductive adhesive or electrically conductive adhesive for EMI shielding.

13. The optical transceiver according to claim 11, wherein the interlayer element has a corresponding cross-sectional profile with the rib structure.

14. The optical transceiver according to claim 10, further comprising a heat sink mounted on an outer surface of the housing, and at least part of the heat sink is located above the gas inlet.

15. The optical transceiver according to claim 10, wherein the optical transceiver is a QSFP-DD 800G transceiver.

16. The optical transceiver according to claim 1, wherein the rib structure is a monolithic structure.

17. The optical transceiver according to claim 2, wherein the interlayer element is in thermal contact with an optical communication component.

18. The optical transceiver according to claim 11, wherein the interlayer element is in thermal contact with an optical communication component.

19. The optical transceiver according to claim 14, wherein the heat sink further comprises a plurality of air channels and wherein the gas inlet is in fluid communication with the plurality of air channels of the heat sink.

20. The optical transceiver according to claim 10, wherein the portion of the gas flow passage proximate the gas outlet comprises an enlarged section.

* * * * *